United States Patent [19]
Mori et al.

[11] Patent Number: 5,188,751
[45] Date of Patent: Feb. 23, 1993

[54] VINYL CHLORIDE RESIN COMPOSITION

[75] Inventors: Toshiyuki Mori, Takasago; Akira Takaki, Kobe; Hirokazu Iguchi, Akashi; Satoshi Suzuki; Hiroto Mori, both of Takasago; Hideki Hosoi, Kobe, all of Japan

[73] Assignee: Kanegafuchi Kagaku Kogyo Kabushiki Kaisha, Osaka, Japan

[21] Appl. No.: 497,365

[22] Filed: Mar. 22, 1990

[30] Foreign Application Priority Data

Mar. 24, 1989 [JP] Japan ................................ 1-73347
Jan. 30, 1990 [JP] Japan ................................ 2-21030

[51] Int. Cl.$^5$ .................... C08G 63/48; C08G 63/91; C08L 27/06
[52] U.S. Cl. .................................. 525/70; 525/239; 525/78; 525/80; 525/83; 525/86
[58] Field of Search ................ 525/82, 86, 78, 80, 525/83, 239, 70

[56] References Cited

U.S. PATENT DOCUMENTS

| | | |
|---|---|---|
| Re. 31,422 | 10/1983 | Loshaek et al. . |
| 3,287,443 | 11/1966 | Saito et al. . |
| 3,406,136 | 10/1968 | Scarso et al. .................. 525/86 |
| 3,990,381 | 11/1976 | Shepherd et al. . |
| 4,431,772 | 2/1984 | Katto et al. .................. 525/82 |
| 4,508,876 | 4/1985 | Takaki et al. . |

FOREIGN PATENT DOCUMENTS

| | | |
|---|---|---|
| 0232139 | 8/1987 | European Pat. Off. . |
| 886343 | 1/1962 | United Kingdom . |
| 1175118 | 12/1969 | United Kingdom ............... 525/86 |

Primary Examiner—James J. Seidleck
Assistant Examiner—W. R. H. Clark
Attorney, Agent, or Firm—Armstrong & Kubovcik

[57] ABSTRACT

A vinyl chloride resin composition having an improved impact resistance with a good transparency which includes (A) a graft copolymer reinforcing agent prepared by emulsion-polmerizing 15 to 35 parts by weight of a monomer mixture in the presence of 85 to 65 parts by weight of a butadiene homopolymer or copolymer having a butadiene content as high as 82% by weight or more, said monomer mixture containing of 50 to 95% by weight of an aromatic vinyl monomer such as styrene, 0.1 to 40% by weight of a vinyl cyanide monomer such as acrylonitrile and 0 to 40% by weight of other vinyl monomer copolymerizable therewith, and (B) a vinyl chloride resin. The butadiene homo- or copolymer may be treated prior to the emulsion polymerization, in order to prevent the produced graft copolymer particles from coagulating into a massive material, by reacting a small amount of a crosslinking monomer and optionally an alkyl acrylate or methacrylate in the presence of the butadiene homo- or copolymer in the form of an aqueous latex.

9 Claims, No Drawings

# VINYL CHLORIDE RESIN COMPOSITION

BACKGROUND OF THE INVENTION

The present invention relates to a vinyl chloride resin composition, and more particularly to a vinyl chloride resin composition having an improved impact resistance with an excellent transparency that the vinyl chloride resin itself possesses originally.

A so-called MBS resin wherein methyl methacrylate, styrene and the like are graft-polymerized onto a butadiene rubber has been used as a reinforcing agent for improving the impact resistance of vinyl chloride resins. It is important that the transparency of the resins is not impaired by the incorporation of the reinforcing agent. Various improvements of the reinforcing agent for vinyl chloride resins or of the process for improving the impact resistance of vinyl chloride resins without impairing the transparency of the resins are also proposed, for instance, as disclosed in Japanese Patent Publication Kokai No. 59-221317. However, demand for improvement of the quality of vinyl chloride resin products is still strong and a further improvement is desired.

As a means for markedly increasing the impact resistance imparting ability of the MBS reinforcing agent for vinyl chloride resins, it is well known to increase the butadiene content of the reinforcing agent. For this purpose, it has been attempted to increase the proportion of the rubber component in the reinforcing agent or to increase the butadiene content in the rubber component. However, the former means, namely the increase of the proportion of the rubber, causes a serious problem that since the graft copolymer changes into a massive material during the preparation thereof when the proportion of the rubber component exceeds about 65% by weight, no satisfactory polymer powder is obtained and moreover the incorporation of the produced graft copolymer into vinyl chloride resins lowers the transparency of molded end products. The latter means, namely the increase of the butadiene content in the rubber component, also causes a serious problem that the transparency of molded end products is markedly lowered. Owing to such problems, there has not been provided a reinforcing agent having a butadiene content of not less than 60% by weight which can impart a high impact resistance to vinyl chloride resins without impairing the high transparency of the resins.

SUMMARY OF THE INVENTION

It has been found that the problems of the lowering of transparency and the difficulty in powdering can be solved by and a high impact resistance can be achieved with the transparency being kept on a high level by skillfully combining the above-mentioned both means to improve the impact resistance imparting ability of the MBS reinforcing agent, namely the means according to the increase of the proportion of the rubber component in the reinforcing agent and the means according to the increase of the butadiene content in the rubber component.

In accordance with the present invention, there is provided a vinyl chloride resin composition having excellent characteristics of impact resistance and transparency, which comprises:

(A) 3 to 30 parts by weight of a graft copolymer having a butadiene content of at least 60% by weight, prepared by emulsion-polymerizing (a) 15 to 35 parts by weight of a monomer mixture of 50 to 95% by weight of an aromatic vinyl monomer, 0.1 to 40% by weight of a vinyl cyanide and 0 to 40% by weight of other vinyl monomer copolymerizable with them in the presence of (b) 85 to 65 parts by weight of a butadiene polymer of 82 to 100% by weight of butadiene and 18 to 0% by weight of other vinyl monomer copolymerizable therewith, the total of the components (a) and (b) being 100 parts by weight, and (B) 97 to 70 parts by weight of a vinyl chloride resin.

Treatment of the butadiene polymer with a crosslinking monomer prior to the graft polymerization is effective for preventing the produced graft copolymer from coagulating into a massive material, whereby the graft copolymer is obtained in a good powder form. Accordingly, in another embodiment of the present invention, a reinforcing agent for vinyl chloride resins is prepared by adding a cross-linking monomer with optionally an alkyl acrylate and/or an alkyl methacrylate to an aqueous latex of the butadiene polymer (b), reacting them and thereafter emulsion polymerizing the monomer mixture (a) in the aqueous latex, in which the cross-linking monomer and the alkyl (meth)acrylate are used in amounts of 0.1 to 3 parts by weight and 0 to 3 parts by weight, respectively, per 100 parts by weight of the total of the components (a) and (b).

The features of the present invention are summarized as follows:

(1) In order to increase the butadiene content of the reinforcing agent, the proportion of the rubber component is greatly increased and moreover the butadiene content in the rubber component is increased, whereby it is intended to improve the impact resistance with keeping the transparency of vinyl chloride resins on a high level.

(2) In order to prevent the lowering of the refractive index of the reinforcing agent owing to the increase of the butadiene content in the reinforcing agent, the proportion of the aromatic vinyl monomer in the graft component is greatly increased.

(3) In order to prevent the lowering of physical properties resulting from the increase of the content of aromatic vinyl monomer in the grafting portion, and in order to eliminate the problem in powder formation, the vinyl cyanide is introduced into the grafting portion so as to raise the softening point of the produced graft copolymer.

(4) Cross-linking monomers may be reacted with the butadiene polymer prior to the graft polymerization, as occasion demands, in order to prevent the produced graft copolymer particles from coagulating into a mass.

DETAILED DESCRIPTION

The butadiene polymer used in the present invention is prepared by polymerizing butadiene and optionally with at least one other vinyl monomer copolymerizable therewith, for example, in a known emulsion polymerization manner.

The copolymerizable other vinyl monomer is used when it is required to raise the refractive index of the produced butadiene polymer or to impart a cross-linked structure to the butadiene polymer. The kind and amount of the copolymerizable vinyl monomer to be used vary depending on the properties desired to improve and the degree of improvement. In general, from the viewpoint of effectively improving the desired properties, it is desirable to use the copolymerizable vinyl monomer so that its content in the produced butadiene polymer is from 0 to 18% by weight.

Representative examples of the vinyl monomer copolymerizable with butadiene are, for instance, an aromatic vinyl compound such as styrene, a vinyl cyanide compound such as acrylonitrile, an alkyl acrylate having $C_1$ to $C_5$ alkyl group such as ethyl acrylate or butyl acrylate, a crosslinking monomer such as divinyl benzene or monoethylene glycol dimethacrylate, and the like. The copolymerizable vinyl monomers used in the invention are not limited to those exemplified above. They are used alone or in admixture thereof.

Butadiene and the other vinyl monomers copolymerizable therewith are used in such amounts as producing the butadiene polymer containing 82 to 100% by weight, preferably 85 to 99.5% by weight, of butadiene and 18 to 0% by weight, preferably 15 to 0.5% by weight, of the other vinyl monomers. When the content of butadiene is less than 82% by weight, the impact resistance of the obtained vinyl chloride resin composition is on the same level as that of conventional compositions and no improvement of the impact resistance is obtained.

The preparation of the butadiene polymer may be carried out by polymerizing the monomer or monomers in one stage, for instance, in a usual emulsion polymerization manner, but it is preferable from the viewpoint of transparency to conduct the polymerization in two stages wherein about 62 to 80% by weight of butadiene and 0 to 18% by weight of the other vinyl monomers are polymerized and the residual butadiene is then polymerized.

The thus prepared butadiene homo- or copolymers have a butadiene content of 82 to 100% by weight which is higher as compared with conventional MBS reinforcing agents.

The butadiene polymers are used usually in the form of an aqueous latex in the following step of graft polymerization. Prior to the graft polymerization, 0.1 to 3 parts by weight of a crosslinking monomer and 0 to 3 parts by weight of at least one of alkyl acrylates and methacrylates based on 100 parts by weight of the total of the butadiene polymer (b) and the graft component (a) may be reacted with the butadiene polymer in the aqueous latex of the butadiene polymer.

The crosslinking monomer serves to cause the graft component to polymerize on the surface of the butadiene polymer particles rather than inside the particles, thereby eliminating the problem encountered in the prior art that the graft copolymers are produced in a massive form and, therefore, no good powder is obtained. When the proportion of the butadiene polymer based on the total weight of the butadiene polymer and the graft component is over 70% by weight, the crosslinking monomer is preferably used in an amount of 0.3 to 3 parts by weight.

In the treatment of the butadiene polymer with the crosslinking monomer, the alkyl acrylate and/or alkyl methacrylate are used optionally for the purpose of fine adjustment of the transparency and impact resistance of the graft copolymer to be produced. In case of using the alkyl (meth)acrylate for this purpose, it is used usually in an amount of not less than about 0.5 parts by weight per 100 parts by weight of the total of the butadiene polymer and the graft component. When the amount exceeds 3 parts by weight, the produced graft copolymer is in a better powder state, but the impact resistance imparting ability is decreased.

Representative examples of the crosslinking monomer are, for instance, divinyl benzene, monoethylene glycol dimethacrylate, polyethylene glycol dimethacrylate, and other known divinyl, diacrylate and dimethacrylate compounds, but are not limited thereto.

The alkyl (meth)acrylates used with the crosslinking monomer are preferably those having a $C_1$ to $C_5$ alkyl group. Representative examples thereof are, for instance, butyl acrylate and methyl methacrylate. They may be used alone or in admixture thereof.

The reaction condition for the treatment of the butadiene polymer prior to the graft polymerization is not particularly limited. In case that the butadiene polymer has been prepared by emulsion polymerization, it is convenient to add the crosslinking monomer and the alkyl (meth)acrylate to the obtained reaction mixture and then to conduct the reaction under the same conditions as the emulsion polymerization, for example, at a temperature of 50° to 70° C. for 0.5 to 2 hours.

In the graft polymerization step, 15 to 35 parts by weight, preferably 20 to 30 parts by weight, of the monomer mixture (a) consisting of 50 to 95% by weight, preferably 70 to 90% by weight, of an aromatic vinyl monomer, 0.1 to 40% by weight, preferably 10 to 30% by weight, of a vinyl cyanide and 0 to 40% by weight, preferably 0 or 0.1 to 20% by weight, of other vinyl monomer copolymerizable with them is emulsion-polymerized in the presence of 85 to 65 parts by weight, preferably 80 to 70 parts by weight, of the butadiene polymer (b). For obtaining a satisfactory ability of imparting the impact resistance to vinyl chloride resins, it is necessary that the produced graft copolymer has a butadiene content of at least 60% by weight, preferably at least 63% by weight. Also, when the amount of the graft component (a) is less than 15 parts by weight, the graft copolymer is apt to become a massive material and no good powder is obtained, and when it is more than 35 parts by weight, the impact resistance is decreased.

The aromatic vinyl monomer serves to prevent lowering of the refractive index of the produced graft copolymer (reinforcing agent) owing to the high butadiene content, thereby bringing the refractive index of the reinforcing agent close to that of vinyl chloride resins. Also, the vinyl cyanide monomer is used in order to prevent lowering of the physical properties such as transparency, impact resistance and powder characteristics resulting from the use of aromatic vinyl monomer included in a high proportion in the grafting portion. When the content of the aromatic vinyl monomer in the graft component (a) is less than 50% by weight, the refractive index of the reinforcing agent becomes too small, and when it is more than 95% by weight, the physical properties such as transparency, impact resistance and powder characteristics are lowered. The vinyl cyanide monomer should be used in an amount of at least 0.1% by weight for obtaining substantial effects produced by its use. When the amount of the vinyl cyanide monomer is over 40% by weight, the physical properties such as transparency and impact resistance are lowered.

The other vinyl monomers copolymerizable with aromatic vinyl monomer and vinyl cyanide monomer may be optionally used when it is desired to improve the processability. If the other vinyl monomers are used in an amount over 40% by weight, it becomes difficult to bring the refractive index of the reinforcing agent close to that of vinyl chloride resins.

Representative aromatic vinyl monomer used in the graft polymerization is styrene, and representative vinyl cyanide is acrylonitrile. Examples of the copolymerizable other vinyl monomers used in the graft polymerization are, for instance, alkyl acrylates and alkyl methacrylates, preferably those having a $C_1$ to $C_5$ alkyl group, such as butyl acrylate and methyl methacrylate, acrylic acid and methacrylic acid, but are not limited thereto. These monomers may be used alone or in admixture thereof.

The method of graft polymerization is not limited to a specific method. For example, the polymerization may be carried out in a normal polymerization manner wherein monomers are added to an aqueous latex of the butadiene polymer and are emulsion polymerized, in a manner wherein after agglomerating the butadiene polymer particles to form larger particles by adding an acid to the aqueous latex, the graft polymerization is conducted, or in a manner wherein a water-soluble electrolyte is added to the aqueous latex prior to the graft polymerization, thereby agglomerating the latex particles to form larger particles during the graft polymerization.

In the graft polymerization, the monomers may be added to the polymerization system at once, intermittently, continuously, or in stages wherein the monomer composition in each stage may be the same or different from each other.

From the viewpoint of the transparency of molded end products made from the resin composition of the invention, it is preferable that the graft copolymer in the latex obtained by the graft polymerization have a weight average particle size of 500 to 2,500 angstroms, which can be measured by an electron microscope, so that the refractive index of the graft copolymer used as the reinforcing agent for vinyl chloride resins comes close to that of the vinyl chloride resins. Typically, it is preferable that the difference in refractive index between the reinforcing agent and the vinyl chloride resins is from about 0 to about 0.01.

From the obtained latex of the graft copolymer, a polymer powder is obtained by adding an acid and/or a salt to the latex to coagulate the polymer particles, thermally treating, washing the polymer particles with water, dehydrating and drying. The powder is blended as a reinforcing agent with a vinyl chloride resin in an amount of 3 to 30% by weight based on the total weight of the powder and the vinyl chloride resin in a usual manner to give the resin composition of the present invention. When the amount of the graft copolymer is less than 3% by weight, no satisfactory improvement of the impact resistance is obtained. When it is more than 30% by weight, both the transparency and the impact resistance of the vinyl chloride resins are decreased.

The reinforcing agent according to the present invention is applicable to any of those generally called vinyl chloride resins or polymers, polyvinyl chloride resins or the like, e.g. vinyl chloride homopolymer, vinyl chloride copolymers having a vinyl chloride content of at least about 80% by weight, and post-chlorinated polyvinyl chloride.

The composition of the present invention may contain usual additives used for vinyl chloride resins, such as stabilizer, lubricant, and the like.

The resin composition of the present invention can be formed into molded articles, for example, by injection molding, calendering, blow molding, and the like. The molded articles have a high impact resistance an a good transparency and are suitably used for the purposes such as bottles and sheets.

The present invention is more specifically described and explained by means of the following Examples, in which all parts and % are by weight unless otherwise noted. It is to be understood that the present invention is not limited to these Examples.

EXAMPLE 1

A polymerization vessel equipped with a stirrer was charged with 200 parts of water, 1.5 parts of sodium oleate, 0.002 part of ferrous sulfate ($FeSO_4.7H_2O$), 0.005 part of disodium ethylenediaminetetraacetate, 0.2 part of formaldehyde sodium sulfoxylate, 0.2 part of tripotassium phosphate, 88 parts of butadiene, 12 parts of styrene, 1.0 part of divinyl benzene and 0.1 part of diisopropylbenzene hydroperoxide. The polymerization was carried out at 50° C. for 15 hours to give a rubber latex of which the weight average particle size of polymer particles was 800 angstroms (hereinafter referred to as "rubber latex A"). The polymerization conversion was 99%.

To 225 parts of the rubber latex A (solid matter: 75 parts) were added 60 parts of water, 0.002 part of ferrous sulfate, 0.004 part of disodium ethylenediaminetetraacetate, 0.1 part of formaldehyde sodium sulfoxylate and 1.5 parts of potassium chloride. To the latex was then continuously added a mixture of 21 parts of styrene, 1.0 part of methyl methacrylate, 3.0 parts of acrylonitrile and 0.1 part of cumene hydroperoxide at 70° C. over 4 hours, and the polymerization was further continued for 1 hour to give an aqueous latex of a graft copolymer.

Sulfuric acid was added to the obtained graft polymer latex to deposit the polymer, and the polymer powder through heat treating, rinsing, dehydrating and drying.

To 91 parts of polyvinyl chloride (average degree of polymerization: 700) containing 1.2 parts of octyl tin mercaptide stabilizer, 0.8 part of glycerol ricinoleate and 0.2 part of a montanic acid ester was added 9 parts of the graft copolymer powder as a reinforcing agent. The mixture was kneaded for 8 minutes by rolls of 170° C., and was pressed for 15 minutes by heat pressure rolls of 190° C. to give Izod impact test specimens having a thickness of 6 mm and transparent sheets having a thickness of 5 mm. The Izod impact strength was measured according to JIS K 7110, and the light transmission was measured according to JIS K 6714. The results are shown in Table 1.

EXAMPLE 2

A polymerization vessel equipped with a stirrer was charged with 200 parts of water, 1.5 parts of sodium oleate, 0.002 part of ferrous sulfate ($FeSO_4.7H_2O$), 0.005 parts of disodium ethylenediaminetetraacetate, 0.2 part of formaldehyde sodium sulfoxylate, 0.2 part of tripotassium phosphate, 68 parts of butadiene, 12 parts of syrene, 1.0 part of divinyl benzene and 0.1 part of diisopropylbenzene hydroperoxide. The polymerization was carried out at 50° C. for 10 hours. After confirming that the polymerization conversion was over 95%, 20 parts of butadiene and 0.05 part of diisopropylbenzene hydroperoxide were added to the system, and the polymerization was further continued for 7 hours to give a latex B of rubber particles having a weight average particle size of 800 angstroms. The polymerization conversion was 99%.

A graft copolymer (reinforcing agent) was prepared in the same manner as in Example 1 except that 225 parts of the thus obtained rubber latex B was used in the graft polymerization. A vinyl chloride resin composition was prepared in the same manner and estimated. The results are shown in Table 1.

EXAMPLE 3

The rubber latex B was prepared in the same menner as in Example 2.

A polymerization vessel was charged with 225 parts of the rubber latex B, 60 parts of water, 0.002 part of ferrous sulfate, 0.004 part of disodium ethylenediaminetetraacetate, 0.1 part of formaldehyde sodium sulfoxylate and 1.5 parts of potassium chloride. To the vessel was continuously added a mixture of 9 parts of styrene, 3 parts of acrylonitrile and 0.05 part of cumene hydroperoxide at 70° C. over 2 hours. After further continuing the polymerization for 30 minutes, 12 parts of styrene, 1.0 part of methyl methacrylate and 0.05 part of cumene hydroperoxide were continuously added over 2 hours. The polymerization was further continued for 1 hour and finished to give an aqueous latex of a graft copolymer. The graft copolymer powder was obtained from the latex and blended with polyvinyl chloride to give a resin composition in the same manner as in Example 1. The results are shown in Table 1.

EXAMPLE 4

A polymerization vessel equipped with a stirrer was charged with 200 parts of water, 1.5 parts of sodium oleate, 0.002 part of ferrous sulfate ($FeSO_4.7H_2O$), 0.005 part of disodium ethylenediaminetetraacetate, 0.2 part of formaldehyde sodium sulfoxylate, 0.2 part of tripotassium phosphate, 74 parts of butadiene, 6 parts of styrene, 1.0 part of divinyl benzene and 0.1 part of diisopropylbenzene hydroperoxide. The polymerization was carried out at 50° C. for 10 hours. After confirming that the polymerization conversion was not less than 95%, 20 parts of butadiene and 0.05 part of diisopropylbenzene hydroperoxide were added to the system, and the polymerization was further continued for 7 hours to give a latex C of a butadiene copolymer having a weight average particle size of 800 angstroms. The polymerization conversion was 99%.

To 210 parts of the rubber latex C (solid matter: 70 parts) were added 70 parts of water, 0.002 part of ferrous sulfate, 0.004 part of disodium ethylenediaminetetraacetate, 0.1 part of formaldehyde sodium sulfoxylate and 1.5 parts of potassium chloride. To the latex was then continuously added a mixture of 24 parts of styrene, 6.0 parts of acrylonitrile and 0.1 part of cumene hydroperoxide at 70° C. over 4 hours, and the polymerization was further continued for 1 hour to give an aqueous latex of a graft copolymer.

From the thus obtained latex, the graft copolymer powder was obtained and incorporated into polyvinyl chloride in the same manner as in Example 1. The results are shown in Table 1.

EXAMPLE 5

The rubber latex A was prepared in the same manner as in Example 1.

To 225 parts of the rubber latex A (solid matter: 75 parts) were added 60 parts of water, 0.002 part of ferrous sulfate, 0.004 part of disodium ethylenediaminetetraacetate, 0.1 part of formaldehyde sodium sulfoxylate and 1.5 parts of potassium chloride.

To the resulting mixture were added 1.0 part of divinyl benzene, 1.0 part of butyl acrylate and 0.1 part of cumene hydroperoxide, and the reaction was carried out at 70° C. for 1 hour.

Then, in order to conduct the graft polymerization, a mixture of 21 parts of styrene, 1.0 part of methyl methacrylate, 3.0 parts of acrylonitrile and 0.1 part of cumene hydroperoxide was continuously added to the reaction mixture at 70° C. over 4 hours. The polymerization was further continued for 1 hour to give an aqueous latex of a graft copolymer.

A resin composition was prepared and estimated in the same manner as in Example 1. The results are shown in Table 1.

EXAMPLE 6

The procedure of Example 2 was repeated except that before adding the monomer mixture to the rubber latex B for the graft polymerization, 1.0 part of divinyl benzene, 1.0 part of butyl acrylate and 0.1 part of cumene hydroperoxide were added and reacted at 70° C. for 1 hour.

The results are shown in Table 1.

EXAMPLE 7

The procedure of Example 3 was repeated except that before adding the monomer mixture to the rubber latex B for the graft polymerization, 1.0 part of divinyl benzene, 1.0 part of butyl acrylate and 0.1 part of cumene hydroperoxide were added and reacted at 70° C. for 1 hour.

The results are shown in Table 1.

COMPARATIVE EXAMPLE 1

A polymerization vessel equipped with a stirrer was charged with 200 parts of water, 1.5 parts of sodium oleate, 0.002 part of ferrous sulfate ($FeSO_4.7H_2$), 0.005 part of disodium ethylenediaminetetraacetate, 0.2 part of formaldehyde sodium sulfoxylate, 0.2 part of tripotassium phosphate, 77 parts of butadiene, 23 parts of styrene, 1.0 part of divinyl benzene and 0.1 part of diisopropylbenzene hydroperoxide. The polymerization was carried out at 50° C. for 15 hours to give an aqueous latex D of a butadiene copolymer having a weight average particle size of 800 angstroms. The polymerization conversion was 99%.

To 180 parts of the obtained rubber latex D (solid matter: 60 parts) were added 70 parts of water, 0.002 part of ferrous sulfate, 0.004 part of disodium ethylenediaminetetraacetate, 0.1 part of formaldehyde sodium sulfoxylate and 1.5 parts of potassium chloride. To the resulting mixture were continuously added 20 parts of styrene, 20 parts of methyl methacrylate and 0.1 part of cumene hydroperoxide at 70° C. over 5 hours. The polymerization was further continued for 1 hour to give an aqueous latex of a graft copolymer.

A resin composition was prepared and estimated in the same manner as in Example 1. The results are shown in Table 1.

COMPARATIVE EXAMPLE 2

To 225 parts of the rubber latex D prepared in the same manner as in Comparative Example 1 (solid matter: 75 parts) were added 60 parts of water, 0.002 part of ferrous sulfate, 0.004 part of disodium ethylenediaminetetraacetate, 0.1 part of formaldehyde sodium sulfoxylate and 1.5 parts of potassium chloride. To the resulting mixture were continuously added 12.5 parts of styrene, 12.5 parts of methyl methacrylate and 0.1 part of cumene hydroperoxide at 70° C. over 4 hours. The polymerization was further continued for 1 hour to give an aqueous latex of a graft copolymer.

A resin composition was prepared and estimated in the same manner as in Example 1. The results are shown in Table 1.

COMPARATIVE EXAMPLE 3

To 257 parts of the rubber latex D (solid matter: 85.7 parts) prepared in the same manner as in Comparative Example 1 were added 50 parts of water, 0.002 part of ferrous sulfate, 0.004 part of disodium ethylenediaminetetraacetate, 0.1 part of formaldehyde sodium suloxylate and 1.5 part of potassium chloride. To the resulting mixture was continuously added a mixture of 7.15 parts of styrene, 7.15 parts of methyl methacrylate and 0.1 part of cumene hydroperoxide at 70° C. over 3 hours. The polymerization was further continued for 1 hour to give a latex of a graft copolymer.

A resin composition was prepared and estimated in the same manner as in Example 1. The results are shown in Table 1.

COMPARATIVE EXAMPLE 4

To 225 parts of the rubber latex B (solid matter: 75 parts) prepared in the same manner as in Example 2 were added 60 parts of water, 0.002 part of ferrous sulfate, 0.004 part of disodium ethylenediaminetetraacetate, 0.1 part of formaldehyde sodium sulfoxylate and 1.5 parts of potassium chloride. To the resulting mixture was continuously added a mixture of 12.5 parts of styrene, 12.5 parts of methyl methacrylate and 0.1 part of cumene hydroperoxide at 70° C. over 4 hours. The polymerization was further continued for 1 hour to give a latex of a graft copolymer.

A resin composition was prepared and estimated in the same manner as in Example 1. The results are shown in Table 1.

COMPARATIVE EXAMPLE 5

The procedure of Comparative Example 4 was repeated except that a monomer mixture of 21 parts of styrene, 4 parts of methyl methacrylate and 0.1 part of cumene hydroperoxide was used in the graft polymerization.

The results are shown in Table 1.

TABLE 1

| | Rubber latex (solid: parts) | Treatment of rubber (parts) | Reinforcing agent Graft component (parts) | | Bu content (%) | State of powder | Refractive index ($N_D$) | Properties of molded PVC composition Izod impact strength | | transmission (%) |
| --- | --- | --- | --- | --- | --- | --- | --- | --- | --- | --- |
| | | | 1st stage | 2nd stage | | | | 23° C. | 0° C. | |
| Ex. 1 | A (75) | — | ST (21) MMA (1) AN (3) | — | 66 | ○ | 1.5389 | 58 | 12.2 | 71 |
| Ex. 2 | B (75) | — | ST (21) MMA (1) AN (3) | — | 66 | ○ | 1.5389 | 57 | 12.0 | 75 |
| Ex. 3 | B (75) | — | ST (9) AN (3) | ST (12) MMA (1) | 66 | ○ | 1.5389 | 58 | 12.1 | 76 |
| Ex. 4 | C (70) | — | ST (24) AN (6) | — | 65.8 | ○ | 1.5379 | 50 | 13.9 | 69 |
| Ex. 5 | A (75) | DVB (1) BA (1) | ST (21) MMA (1) AN (3) | — | 66 | ◎ | 1.5389 | 62 | 11.7 | 73 |
| Ex. 6 | B (75) | DVB (1) BA (1) | ST (21) MMA (1) AN (3) | — | 66 | ◎ | 1.5389 | 60 | 11.2 | 76 |
| Ex. 7 | B (75) | DVB (1) BA (1) | ST (9) AN (3) | ST (12) MMA (1) | 66 | ◎ | 1.5389 | 61 | 11.6 | 77 |
| Com. Ex. 1 | D (60) | — | ST (20) MMA (20) | — | 46 | ◎ | 1.5380 | 22 | 4.0 | 77 |
| Com. Ex. 2 | D (75) | — | ST (12.5) MMA (12.5) | — | 58 | X | 1.5360 | 40 | 6.1 | 72 |
| Com. Ex. 3 | D (85.7) | — | ST (7.15) MMA (7.15) | — | 66 | XX | 1.5350 | 25 | 6.2 | 65 |
| Com. Ex. 4 | B (75) | — | ST (1.25) MMA (12.5) | — | 66 | X | 1.5296 | 59 | 12.0 | 51 |
| Com. Ex. 5 | B (75) | — | ST (21) MMA (4) | — | 66 | X | 1.5382 | 30 | 4.0 | 66 |

(Notes)
Bu: Butadiene
ST: Styrene
MMA: Methyl methacrylate
DVB: Divinyl benzene
BA: Butyl acrylate
State of powder: ◎: Very good ○: Good X: Bad XX: Very bad In addition to the ingredients used in the Examples, other ingredients can be used in the Examples as set forth in the specification to obtain substantially the same results.

What we claim is:

1. A vinyl chloride resin composition which comprises
(A) 3 to 30 parts by weight of a graft copolymer having a butadiene content of at least 60% by weight prepared by reacting (i) 0.1 to 3 parts by weight of a monomer which is a crosslinking agent selected form the group consisting of divinyl benzene, diacrylate compounds and dimethacrylate compounds, and (ii) 0 to 3 parts by weight of at lest one of an alkyl acrylate and an alkyl methacrylate in the presence of (b) 85 to 65 parts by weight of a butadiene polymer of 82 to 100% by weight of butadiene and 18 to 0% by weight of other vinyl monomers copolymerizable therewith, said other vinyl monomers containing less than 1% of a crosslinking agent, and then emulsion polymerizing the reaction product with (a) 15 to 35 parts by weight of a monomer mixture of 50 to 95% by weight of an aromatic vinyl monomer, 0.1 to 40% by weight of a vinyl cyanide monomer and 0 to 40% by weight of other vinyl monomer copolymerizable therewith, the total of said butadiene polymer (b) and said monomer mixture (a) being 100 parts by weight and the amounts of the components (i) and (ii) being based on 100 parts by weight of the total of the components (a) and (b), such that said crosslinking agent serves to polymerize said graft component primarily on a surface of said butadiene polymer, and (b) 97 to 70 parts by weight of a vinyl chloride resin.

2. The composition of claim 1, wherein said butadiene polymer is a copolymer of butadiene and styrene.

3. The composition of claim 1, wherein said butadiene polymer is a copolymer of butadiene, styrene and a crosslinking agent.

4. The composition of claim 1, wherein said aromatic vinyl monomer is styrene.

5. The composition of claim 1, wherein said vinyl cyanide monomer is acrylonitrile.

6. The composition of claim 1, wherein said monomer mixture contains 50 to 95% by weight of styrene, 0.1 to 40% by weight of acrylonitrile and 0.01 to 20% by wight of other vinyl monomer copolymerizable therewith.

7. The composition of claim 1, wherein said other vinyl monomer is said monomer mixture is at least one member selected from the group consisting of an alkyl acrylate having a $C_1$ to $C_5$ alkyl group, an alkyl methacrylate having a $C_1$ to $C_5$ alkyl group, acrylic acid and methacrylic acid.

8. The composition of claim 1, wherein said butadiene polymer is a copolymer of 82 to 100% by wight of butadiene and 18 to 0% by wight of at least one other vinyl monomer copolymerizable with butadiene selected from the group consisting of an aromatic vinyl compound, an alkyl acrylate having a $C_1$ to $C_5$ alkyl group and a crosslinking agent.

9. The composition of claim 1, wherein said graft copolymer has a butadiene content of at least 70% by weight.

* * * * *